Figure 1:
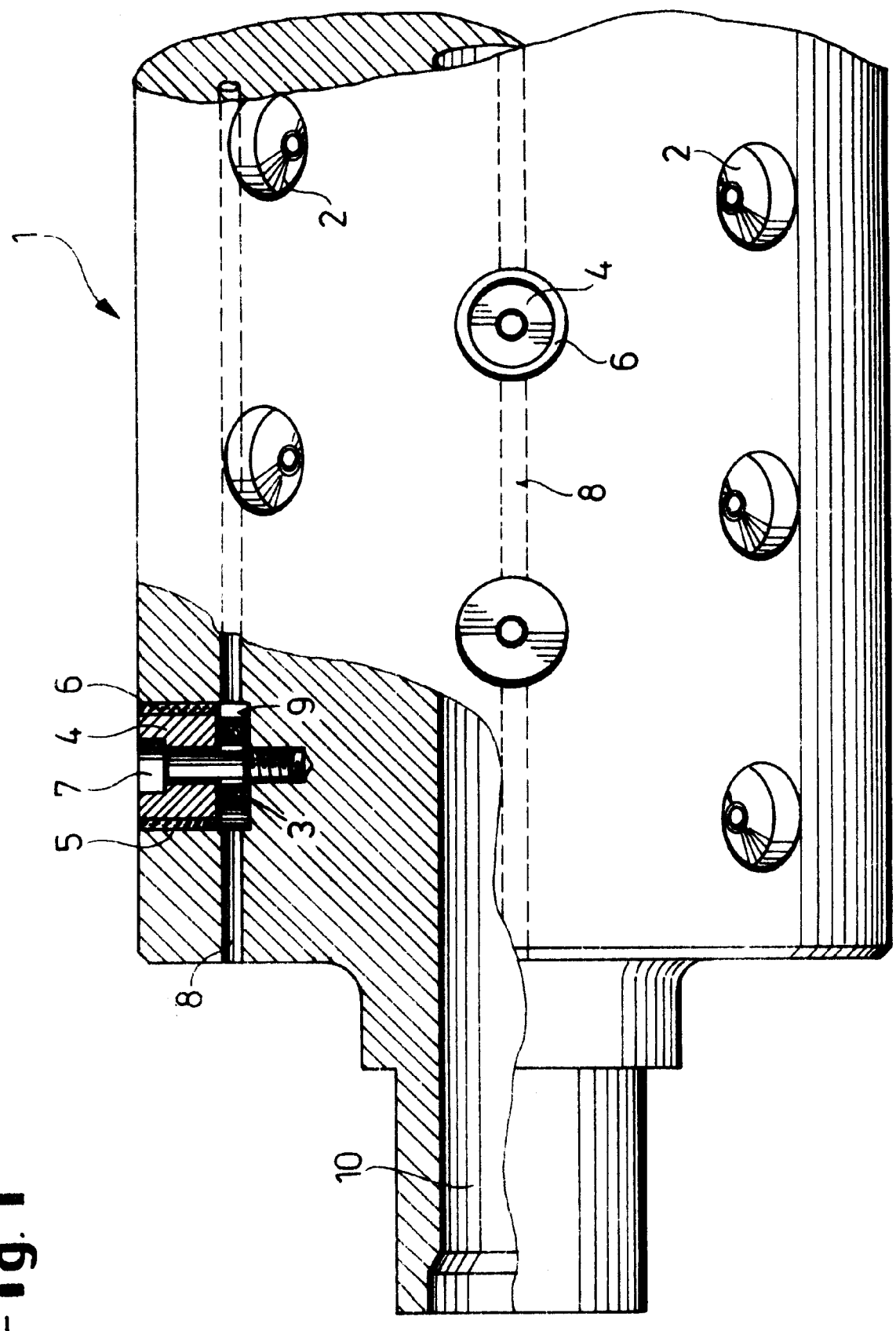

United States Patent
Neuschütz et al.

[11] Patent Number: 6,138,506
[45] Date of Patent: Oct. 31, 2000

[54] MEASURING IDLER-ROLLER

[75] Inventors: Eberhard Neuschütz, Ratingen; Gert Mücke, Hilden; Helmut Thies, Kaarst, all of Germany

[73] Assignee: Betriebsforschungsinstitut, VDEH - Institut fur angewandte Forschung GmbH, Dusselforf, Germany

[21] Appl. No.: 08/837,692

[22] Filed: Apr. 22, 1997

[30] Foreign Application Priority Data

Apr. 27, 1996 [DE] Germany ............................ 196 16 980

[51] Int. Cl.[7] .................. G01L 5/04; G01L 5/06
[52] U.S. Cl. ................. 73/159; 73/818; 73/829; 73/962; 73/391; 73/862.55
[58] Field of Search ............... 73/159, 818, 829, 73/862.391, 862.55

[56] References Cited

U.S. PATENT DOCUMENTS

| | | | |
|---|---|---|---|
| 3,788,133 | 1/1974 | Paelian et al. | 73/141 |
| 3,902,363 | 9/1975 | Ishimoto | 73/159 |
| 4,366,720 | 1/1983 | Berger et al. | 73/862.07 |
| 4,429,580 | 2/1984 | Testa et al. | 73/768 |
| 5,285,684 | 2/1994 | Uesugi et al. | |
| 5,629,487 | 5/1997 | Mücke et al. | 73/159 |

FOREIGN PATENT DOCUMENTS

| | | | |
|---|---|---|---|
| 33 26 593 | 1/1985 | Germany | 73/159 |
| 37 01 680 | 8/1988 | Germany | 73/159 |
| 42 36 657 | 5/1994 | Germany . | |

*Primary Examiner*—Hezron Williams
*Assistant Examiner*—Dennis S Loo
*Attorney, Agent, or Firm*—Merchant & Gould P.C.

[57] ABSTRACT

The invention concerns a measuring idler-roller for measuring stress distribution of flexible bands that are moved in the direction of their length, in which roller force-measuring transducers arranged in recesses or their covers are surrounded by a plastic layer that fills in a gap and prevents the penetration of fine abraded metal particles, and makes easier the installation of the cover and/or the measuring transducer.

10 Claims, 3 Drawing Sheets

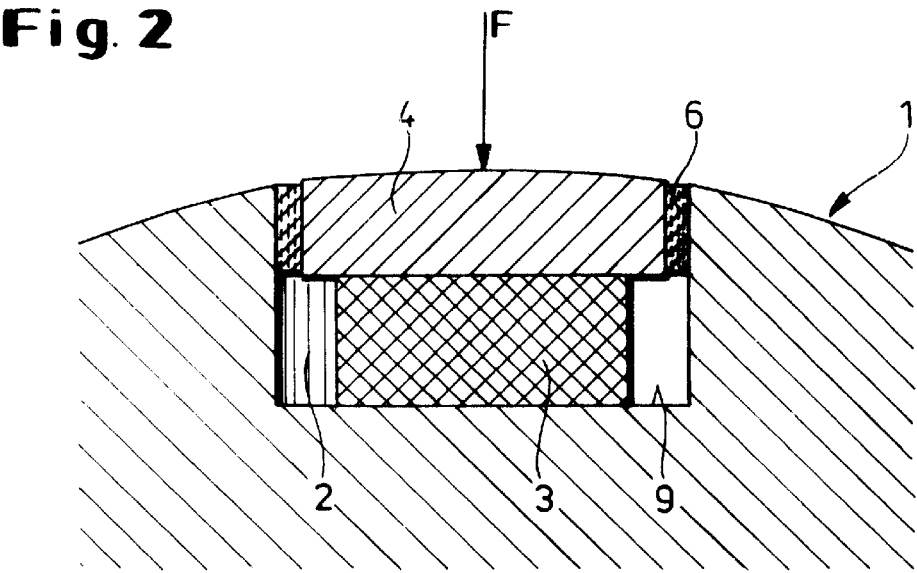
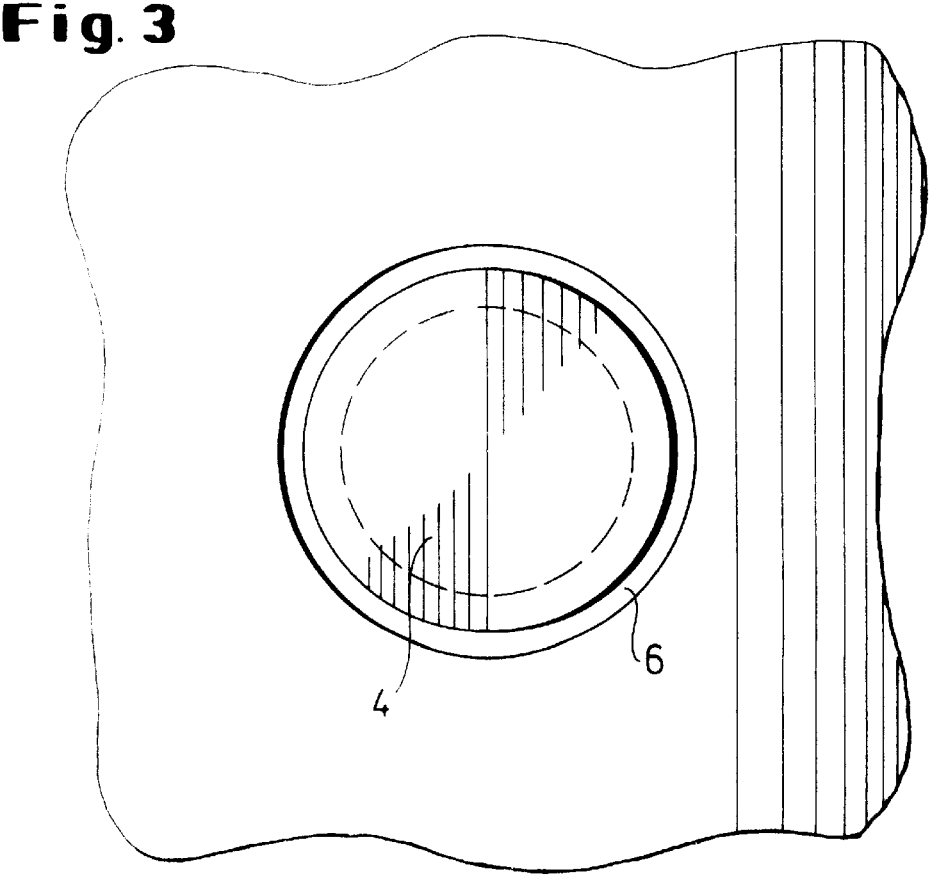

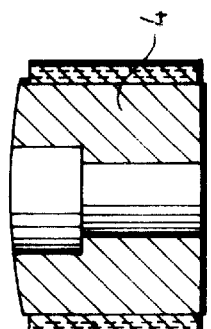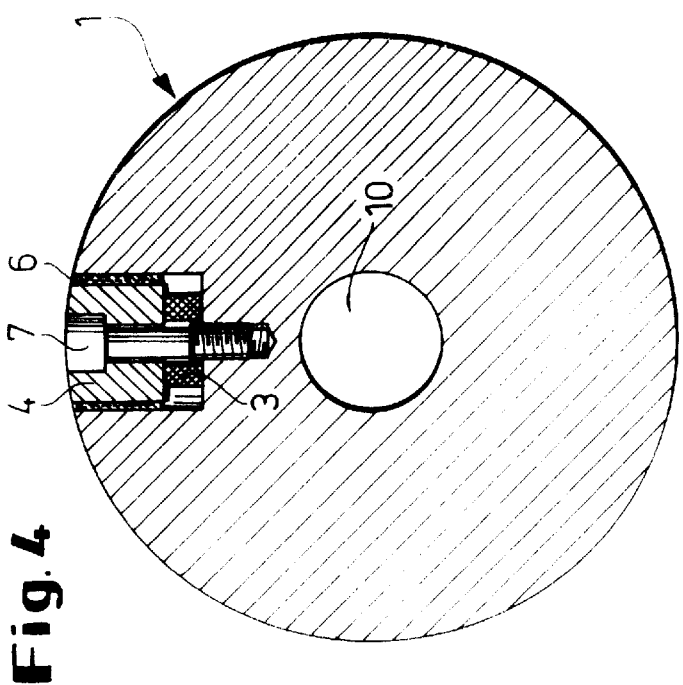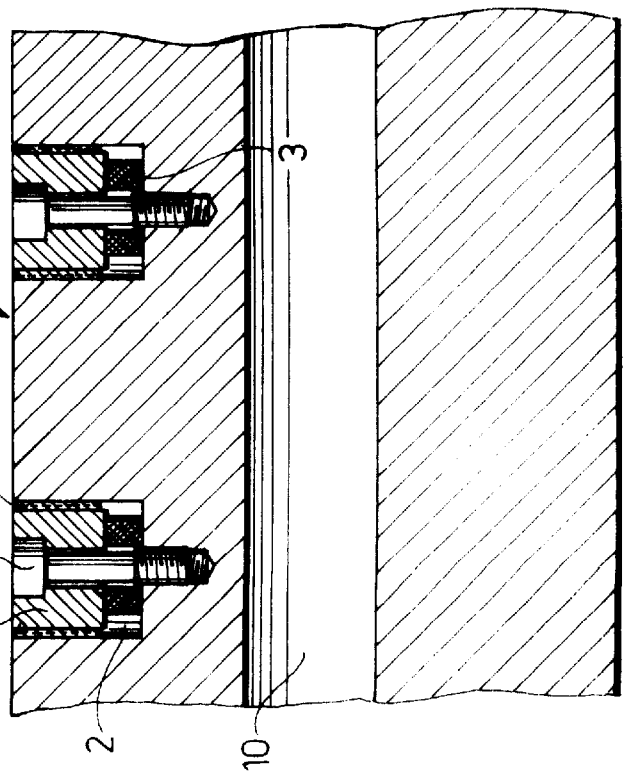

MEASURING IDLER-ROLLER

The invention concerns a measuring idler-roller for measuring stress distribution of flexible bands that are moved in the direction of their length.

For measuring the stress distribution, the object to be measured, for example a steel band in cold rolling, is guided over an idler roller. The measurement is accomplished by force-measuring transducers located in the roller, which transducers scan the passing band.

The band exerts a force on the roller, through which the roller is subjected to a bending stress. The roller is elastically deformed by the bending force. The roller cross-section is forced thereby into an elliptical shape, whose longer axis lies parallel to the course of the band. This deformation of the roller can simulate in the transducer a signal effected by the band, if the deformation is transferred to the measuring transducer or to its cover and thus exerts a force that the measuring transducer cannot distinguish from the force exerted by the band. That leads to an adulteration of the measurement results.

The German Published Application 42 36 657 solves this problem by means of a measuring idler-roller, whereby covers of force-measuring transducers located in cylindrical recesses lie directly against the surface of the band to be tested, and where a circumscribing gap is located between the inside wall of the recess and the cover. The gap prevents effective forces and moments in the measuring roller from influencing the transducer through the cover. The cover is centered here and shows a narrow circumscribing gap that reaches to the base of the recess.

The adjustment of this gap is costly in time and is complicated; it can often be realized only with difficulty and leads to an increase in operating and installation costs of the measuring idler-roller.

A further measuring roller is known from U.S. Pat. No. 5,285,684; the roller consists of individual discs that are arranged next to each other and penetrated and held together by bolts parallel to the axis. The discs possess windows in which the force-measuring transducers are located. While the discs lie side by side in the core region of the measuring roller, a gap exists between every two discs in the region of the measuring transducer, which gap is supposed to prevent a mutual influence of the regions near the surface of the neighboring discs. In order to minimize the danger of an influx of coolant or dirt into the gaps, the facing front sides of the neighboring discs are provided with circular grooves that in each case in pairs accept a sealing ring. Since the grooves in each case partially grasp the sealing ring from two facing sides they must necessarily run at a certain distance from the measuring-roller surface. This distance increases still more due to the fact that the measuring roller requires a certain oversize relative to the diameter that permits a repeated dressing of the roller jacket surface for ridding it of surface defects caused by operation. Consequently the known measuring roller shows besides the sealing rings between every two discs a more or less deep circumscribing gap. The roller surface presented to the band is therefore irregular.

The problem on which the invention is based is to minimize the time-consuming and, in part, the imprecise installation of the measuring transducer and, provided that it exists, also of its cover, but beyond that to prevent the penetration into the gaps of dirt, in particular of metal abrasion products.

The concept forming the basis for the solution of the problem is to eliminate the expensive adjustment of the gaps or the centering of possible covers and/or of the force-measuring transducers in their recesses by closing the gap with a material that forces the transducer or its cover into an optimal position, but possesses a modulus of elasticity lower than that of the transducer cover and of the inside wall of the recess and thus does not transfer disturbing forces and moments to the transducer.

In detail the problem is solved in this way, that, for example, the circumferential surface of the measuring transducer or of a transducer cover is provided with a plastic layer that closes the gap up to the wall of the recess. The plastic layer possesses a thickness that, first of all, is greater than the difference between the diameter of the measuring transducer or of a measuring-transducer cover and the diameter of the recess, i.e., greater than the gap between the measuring transducer or the cover and the inner walls.

Accordingly the unjacketed measuring transducer or the unjacketed measuring-transducer cover is oversize with respect to the recess at room temperature.

For insertion of a measuring transducer, for example with a coated measuring-transducer cover of greater diameter than that of the measuring transducer, into the recess of the measuring idler-roller, the cover can be cooled down and the roller body can be heated. Through this, the circumference of the cover along with its coating is reduced while the diameter of the recess due to thermal expansion is increased. Under these conditions the cover can be inserted into the recess without any problem. With the two bodies adapting to room temperature the cover is automatically centered so that a gap arises between the cover and the recess that is uniform, but sealed with plastic. In a similar way a force-measuring transducer can be inserted into the gap without a cover. In this case, the cover is as it were integrated into the measuring transducer housing, the head of which then reaches up to the surface of the measuring roller and a can have a greater diameter than the remaining part of the measuring transducer housing. Cover and measuring transducer then form a unit.

The expensive and difficult centering of measuring transducers or measuring-transducer covers known from prior art is consequently superfluous with measuring idler-rollers according to the invention. Through this the assembly expense of the measuring roller is considerably reduced. The centering according to the invention in addition precludes a subsequent slipping of the cover or of the measuring transducer in the recess. The forced positioning that the measuring-transducer cover and the measuring transducer assume with the measuring roller according to the invention is slip-free and stable even during prolonged use. At the same time distorting forces and distorting moments from deformation of the roller are assumed by the plastic layer and are not transmitted to the cover or to the measuring transducer. The modulus of elasticity of the plastic layer is advantageously so chosen that it enables a secure centering without transferring forces from the roller to the cover.

A further advantage of the measuring idler-roller according to the invention lies in the sealing of the gap with plastic between the measuring-transducer cover or of the measuring transducer and the recess. Fine particles of abraded metal, which when measuring steel bands present a special problem for reliable functioning of the measuring roller, can no longer penetrate into the gap and hinder the functioning of the measuring transducer.

The plastic layer need exist only in the upper part of the recess; it can also be arranged on the walls of the recess before the insertion.

A penetration of dirt is especially effectively avoided if the plastic located in the gap reaches up to the roller surface.

Through this a complete sealing of the gap between measuring transducer and inner wall of the recess is achieved and—should the occasion arise after grinding—a completely smooth roller surface results.

In the following the invention is explained in more detail with the aid of one of the implementation examples represented in the drawings. The drawings show:

FIG. 1 a measuring roller with measuring transducers and their covers inserted into recesses;

FIG. 2 a section through a measuring transducer with cover located in the roller, from FIG. 1;

FIG. 3 a plan view of the roller surface with the cover of the measuring transducer of FIG. 2;

FIG. 4 a cross-section through the measuring roller with a measuring-transducer cover fixed by means of threaded bolts;

FIG. 5 a longitudinal section through the measuring roller of FIG. 4 with a measuring transducer and its cover and FIG. 6 an axial longitudinal section through the roller of FIG. 4.

The measuring idler-roller 1 possesses a multiplicity of recesses 2. Piezo-electric measuring transducers 3 with cover 4 are inserted into the recesses 2. The measuring transducers 3 are seated between the bottom 9 of the recesses 2 and the cover 4. The cover 4 is provided with a plastic layer 6. A gap 5 appears between the cover 4 of the measuring transducer 3 and the recess 2 of the roller 1 due to the different diameters of the cover 4 and the recess 2, which gap is closed up by the plastic layer 6 upon insertion of the cover.

The diameter of the recesses 2 is chosen so that the cover 4 with the plastic layer 6 before insertion into the recess has a greater diameter than the recess.

In the measuring idler-roller 1 are located bores 8 that accept the measuring wires of the measuring transducers. The bores can lead to a central bore 10 in the roller axis, through which the measuring wires can be lead out of the measuring idler-roller (not represented).

For the installation of the cover 4 with the plastic layer 6 into the recess 2, first of all the roller is heated so that the diameter of the recess 2 is enlarged as a result of thermal expansion, and the cover 4 along with the plastic layer 6 are cooled down, so that their diameters are reduced. As a result the cover 4 along with the plastic layer 6 can be inserted into the enlarged recesses 2 without problem. With the warming of the cover due to the temperature difference with respect to the measuring roller and with the cooling of the roller to room temperature, the seating of the cover in the recess is firmly established, the cover being centered by the fact that the gap between the recess and the cover is filled evenly by the plastic layer.

After installation the cover 4 is fixed in the recess 2 by means of a bolt 7. The measuring transducer 3 is designed as a ring that surrounds the bolt 7.

During measurement the radial force of the circumscribing band is effective in the direction of the arrow F directly on the measuring-transducer cover 4, which in turn impinges upon the measuring transducer 3 and by this produces a measurement signal, since it presses the measuring transducer against the floor 9 of the recess 2. The plastic layer 6 possesses advantageously an essentially lower modulus of elasticity than the cover 4 and the roller 1 or, as the case may be, the wall material in the region of the recess 2. The deformation-caused disturbance forces and moments of the roller 1 are thus not transferred to the cover 4 and, through this, onto the measuring transducer, but rather lead merely to a deformation of the plastic layer 6. An adulteration of the measurement results is thus prevented, while at the same time a centered, secure seating of the cover 4 in the recess 2 is assured.

As represented in the drawing, the plastic layer fills in the gap 5 up to the surface of the roller 1 and the cover 4, which fact prevents a penetrating of disturbing dirt particles and—should the surface be machined—results in a totally smooth roller surface.

What is claimed is:

1. Measuring idler-roller for determination of the stress distribution in rolling of thin bands, in particular in cold-rolling of thin sheet steel, with
   a force-measuring transducer arranged in a recess having a wall, the transducer spaced apart from the wall;
   a transducer cover that covers the transducer; and
   a gap that is closed by a plastic layer that possesses a thickness that is greater than a difference between either a diameter of the transducer and a diameter of a transducer cover or the diameter of the transducer and a diameter of the recess.

2. Measuring idler-roller according to claim 1, wherein the plastic layer extends up to the surface of the measuring roller.

3. Measuring idler-roller according to claim 1, wherein the plastic layer possesses a lower modulus of elasticity than the measuring idler-roller.

4. Measuring idler-roller according to claim 1, wherein the thickness of the plastic layer in situ is 0.01 to 0.05 mm.

5. Measuring idler-roller according to claim 1, wherein the gap is located between the transducer cover and the wall of the recess.

6. Measuring idler-roller according to claim 1, wherein the recess possesses a circular cross-section.

7. Measuring idler-roller according to claim 1, wherein a contact-surface of the measuring roller shows an integrated relief design.

8. Measuring idler-roller according to claim 1, wherein the force-measuring transducer is designed as a ring.

9. Measuring idler-roller according to claim 1, wherein the measuring transducer is tightened to a floor of the recess by means of a stud.

10. Measuring idler-roller according to claim 1, wherein the measuring transducer is tightened to a floor of the recess by means of a bolt.

* * * * *